United States Patent
Crowley et al.

(10) Patent No.: US 6,915,524 B2
(45) Date of Patent: Jul. 5, 2005

(54) METHOD FOR CONTROLLING MULTIPLE STORAGE DEVICES FROM A SINGLE SOFTWARE ENTITY

(75) Inventors: Robert Peter Crowley, Rochester, MN (US); Andrew Thomas Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 09/827,494

(22) Filed: Apr. 6, 2001

(65) Prior Publication Data

US 2002/0152295 A1 Oct. 17, 2002

(51) Int. Cl.$^7$ ................................................ G06F 3/00
(52) U.S. Cl. ........................ 719/321; 719/326; 719/327
(58) Field of Search ................................ 719/321, 326, 719/327; 709/202, 208, 211–212, 216, 223, 226; 710/36, 110; 340/825–825.98; 700/3; 712/31

(56) References Cited

U.S. PATENT DOCUMENTS

| | | | | |
|---|---|---|---|---|
| 5,604,843 A | * | 2/1997 | Shaw et al. | 358/1.1 |
| 6,301,605 B1 | * | 10/2001 | Napolitano et al. | 709/201 |
| 6,711,574 B1 | * | 3/2004 | Todd et al. | 707/100 |
| 6,825,941 B1 | * | 11/2004 | Nguyen et al. | 358/1.15 |
| 2002/0091828 A1 | * | 7/2002 | Kitamura et al. | 709/226 |
| 2002/0156984 A1 | * | 10/2002 | Padovano | 711/148 |

\* cited by examiner

*Primary Examiner*—Frantz B. Jean
(74) *Attorney, Agent, or Firm*—Moser, Patterson & Sheridan, LLP

(57) ABSTRACT

Method and apparatus for controlling a plurality of storage devices connected to a host server system from a network server system are provided. One embodiment provides a method for controlling a plurality of devices connected to a host system, comprising: receiving, by an input/output processor (IOP) on a network server system, a device request from a network server operating system; determining to which one of the plurality of devices is the device request directed; creating a host system request for the one of the plurality of devices; and sending the host system request to an IOP of the host system. Another embodiment provides a medium containing program code that, when executed by a computer, causes the computer to perform a method for controlling a plurality of devices connected to a host system.

25 Claims, 3 Drawing Sheets

METHOD FOR CONTROLLING MULTIPLE STORAGE DEVICES FROM A SINGLE SOFTWARE ENTITY

BACKGROUND OF THE INVENTION

1. Field of the Invention

The present invention generally relates control of a plurality of storage devices attached to a server system. More particularly, the present invention relates to a method for controlling a plurality of storage devices connected to a host server system from a network server system.

2. Description of the Related Art

Computers and their application programs are used in all aspects of business, industry and academic endeavors. In recent years, computer systems having a server system and/or other networked server systems have become prevalent, and many types of server systems have been developed. In one type of server systems, a plurality of network server systems are connected to a host server system. The host server system includes an IOP (Input/Output Processor) having a SCSI (Small Computer System Interface) bus/port and a plurality of SCSI devices are attached to the SCSI bus/port. The SCSI devices may include a plurality of storage devices, such as a DASD (Direct Access Storage Device), an optical storage device, and a tape drive.

When access and control of a particular SCSI device from the network server systems are desired, the network server operating system generates a device request for the particular SCSI device. The device request calls a device drivers from a library of device drivers available on the network server operating system, and the device driver for the particular SCSI device creates a host server system request for the command to the particular SCSI device attached to the host server system. The device driver sends the host server system request to an IOP of the network server system, which communicates with the IOP of the host server system. The host server system request is received and processed by the IOP on the host server system, and the requested task is performed on the particular SCSI device attached to the host server system.

Since the processor chip on the IOP of the network server system typically has only one or two interfaces for communicating with the plurality of device drivers, synchronization mechanisms designed for synchronizing the plurality of device drivers on the network server system are require for the IOP on the network server system to perform properly. However, the synchronization mechanisms degrade performance of the IOP on the network server system and increase complications to the codes for the plurality of device drivers.

Therefore, there exists a need for a method for controlling a plurality of storage devices connected to a host server system from a network server system which does not require synchronization of a plurality of device drivers on the network server system. It would be desirable for the method to provide improved performance of the network server system and simplification of codes for the device driver.

SUMMARY OF THE INVENTION

Method and apparatus for controlling a plurality of storage devices connected to a host server system from a network server system are provided. In one aspect, synchronization mechanisms utilized for a plurality of device drivers on a network server operating system are no longer required. In another aspect, the performance of the network server system has been improved, and the codes for the device driver are simplified.

One embodiment provides a method for controlling a plurality of devices connected to a host system, comprising: receiving, by an input/output processor (IOP) on a network server system, a device request from a network server operating system; determining to which one of the plurality of devices is the device request directed; creating a host system request for the one of the plurality of devices; and sending the host system request to an IOP of the host system.

Another embodiment provides a medium containing program code that, when executed by a computer, causes the computer to perform a method for controlling a plurality of devices connected to a host system, comprising: receiving, by an input/output processor (IOP) on the computer, a device request from a computer operating system; determining to which one of the plurality of devices connected to the host system is the device request directed; creating a host system request for one of the plurality of devices; and sending the host system request to an IOP of the host system.

Another embodiment provides a method for controlling a plurality of Small Computer System Interface (SCSI) storage devices connected to a host server system, comprising: sending a SCSI request from a network server operating system to an input/output processor (IOP) on the network server system, wherein the IOP on the network server system includes a device driver for receiving the SCSI request; determining, utilizing the device driver, to which one of the plurality of SCSI storage devices is the SCSI request is directed; creating a host server system request for one of the plurality of SCSI storage devices; and sending the host server system request to an IOP of the host server system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1A:
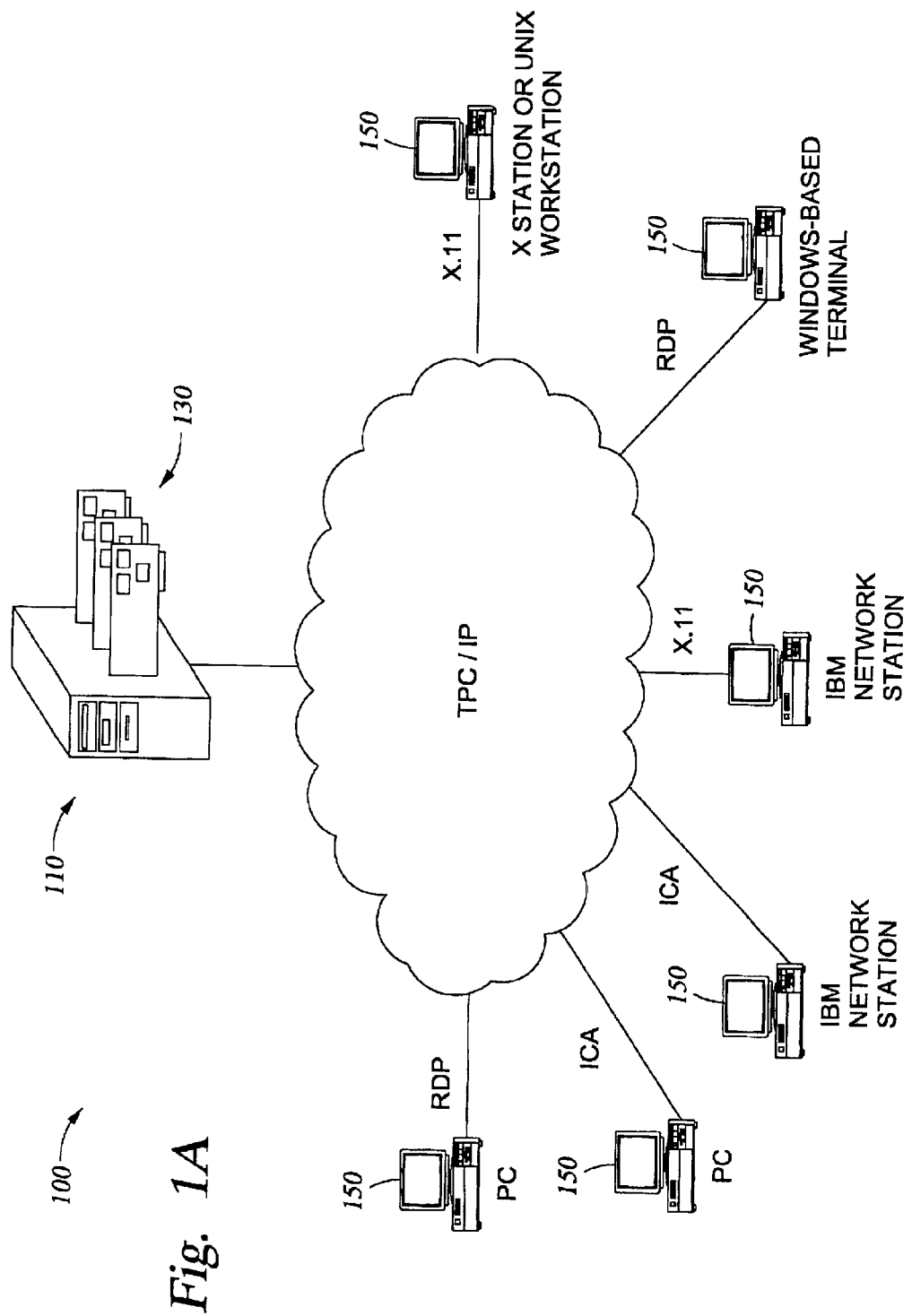
FIGS. 1a, 1b is a schematic diagram illustrating a client/server system having a host server and a plurality of network servers.
Figure 1B:
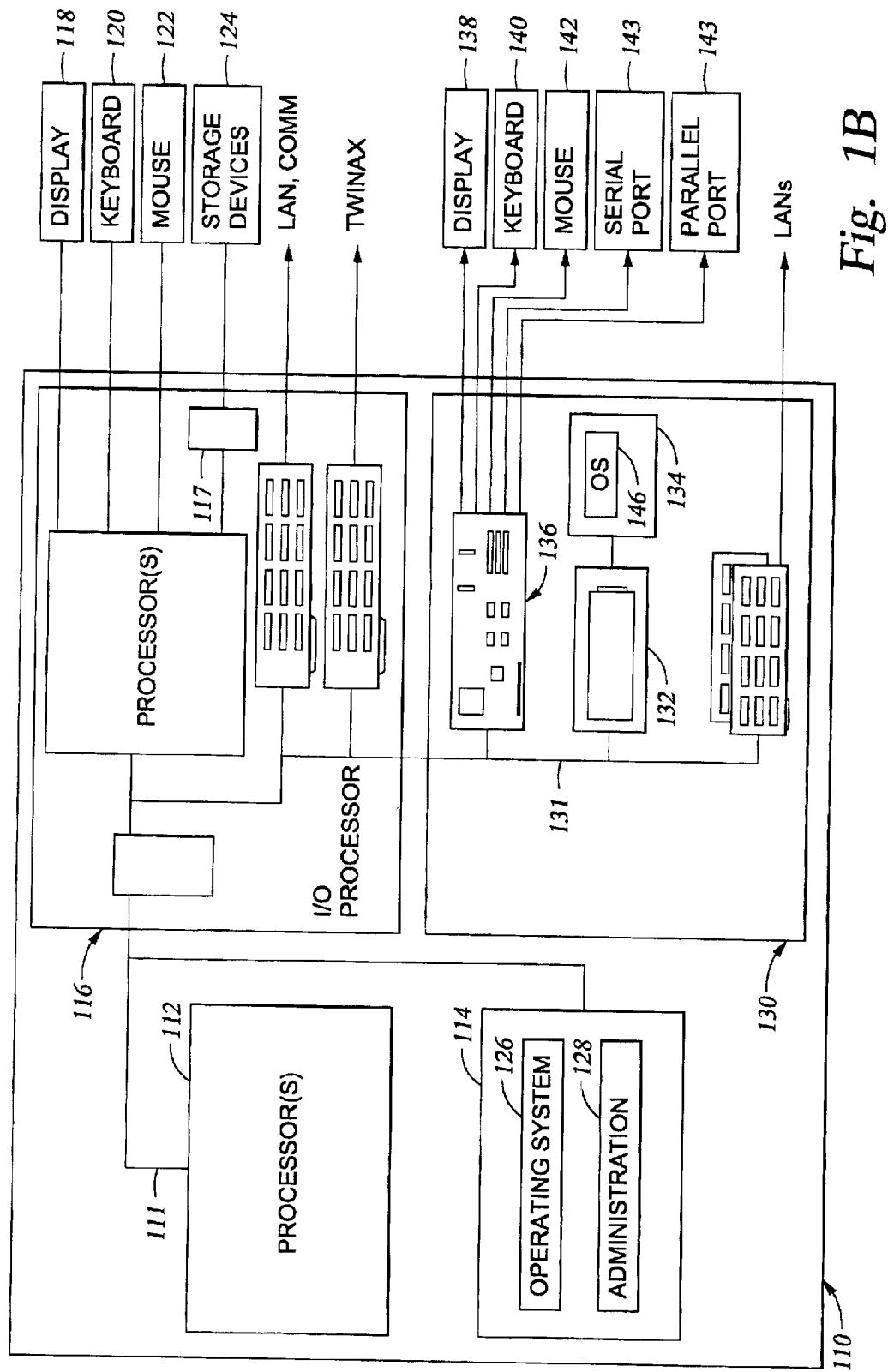

FIG. 1 is a schematic diagram illustrating a client/server system having a host server and a plurality of network servers. The client/server system 100 includes a host server 110 and one or more network servers 130 disposed in connection with the host server 110. A plurality of clients 150 (e.g., client computers and network stations) may be connect to the host server 110 and/or the network servers 130 through local area networks, wide area networks, and remote access connections. The clients 150 may communicate through TCP/IP (Transfer Control Protocol/Internet Protocol) with the servers 110,130.

The one or more network servers 130 may comprise one or more integrated servers built on a PCI (Peripheral Component Interconnect) or SPD (System Product Division) card that can be installed onto PCI or SPD slots of the host server. The network servers 130 may be housed in the same housing as the host server. Alternatively, network servers 130 may be housed in one or more separate housings. The host server 110 and the network servers 130 are connected and communicate through an internal LAN (local area network) connection (e.g., a PCI bus).

The host server 110 includes one or more processors 112, memory 114, an I/O (input/output) processor 116, and a system bus 111 connecting these components. Input/output devices such as a display monitor 118, a keyboard 120, and a pointing device 122 (e.g., mouse) are connected to the host server 110 through the I/O processor 116. One or more storage devices 124, such as direct access storage device (DASD), tape storage devices, CD-ROM (compact disc read only memory), and other optical or magnetic storage devices, may be connected to the host server 110 through SCSI bus/ports 117 connected to the I/O processor 116. Data files, software programs, and other information may be stored on the storage devices 124. One or more software programs, such as a host server operating system 126 (e.g., IBM OS/400) and a host server administration software program 128, may be stored in memory 114 or alternatively, in the storage devices 124. Operation of the host server operating system 126 and the host server 110 may be controlled by user input through I/O devices such as the keyboard 120 and the pointing device 122.

The network server 130 includes one or more processors 132, memory 134, a bridge/support logic 136 and one or more LAN cards 148. These components of the network server are connected to a PCI bus 131, which connects the network server to the I/O processor 116 of the host server 110. Input/output devices such as a display monitor 138, a keyboard 140, and a pointing device 142 (e.g., mouse) are connected to the network server 130 through the bridge/support logic 136. Additional I/O ports 143 may include one or more serial ports and parallel ports. One or more software programs, such as a network server operating system 146 (e.g., Windows 2000 and Windows NT server operating systems) may be stored in memory 134. Operation of the network server operating system 146 and the network server 130 may be controlled by user input through I/O devices such as the keyboard 140 and the pointing device 142.

The network server operating system described herein refers to any server operating system that can use a software disk drive image that appears to the network server as a physical drive or actual device. For example, the IBM Integrated xseries server for iSeries supports such software disk drive image when running a server operating system such as Windows 2000. The disk drives in such exemplar environment are actually IFS (Integated File System) files that are presented to the Windows server as disk drives. Disk drive images appear to the network server operating system as a disk drive with the help of a disk driver and lower layer processes (e.g., SLIC or System Licensed Internal Code through a TIMI or Technology Independent Machine Interface) that can read from the file similar to a normal disk driver that can read from a hard disk. The disk drive image is partitioned, formatted, and supports all the normal disk drive requests that the network server operating system expects.

A commercial example of a client/server system having a host server and a plurality of network servers is the IBM iSeries server (host) with the IBM xSeries integrated servers.

Although embodiments of the invention are described utilizing the IBM OS/400® operating system running on IBM iSeries server and in connection with the IBM xSeries integrated servers running a Windows® 2000 server operating system, it is understood that other embodiments may be practiced on other server systems and other operating systems.

Figure 2:
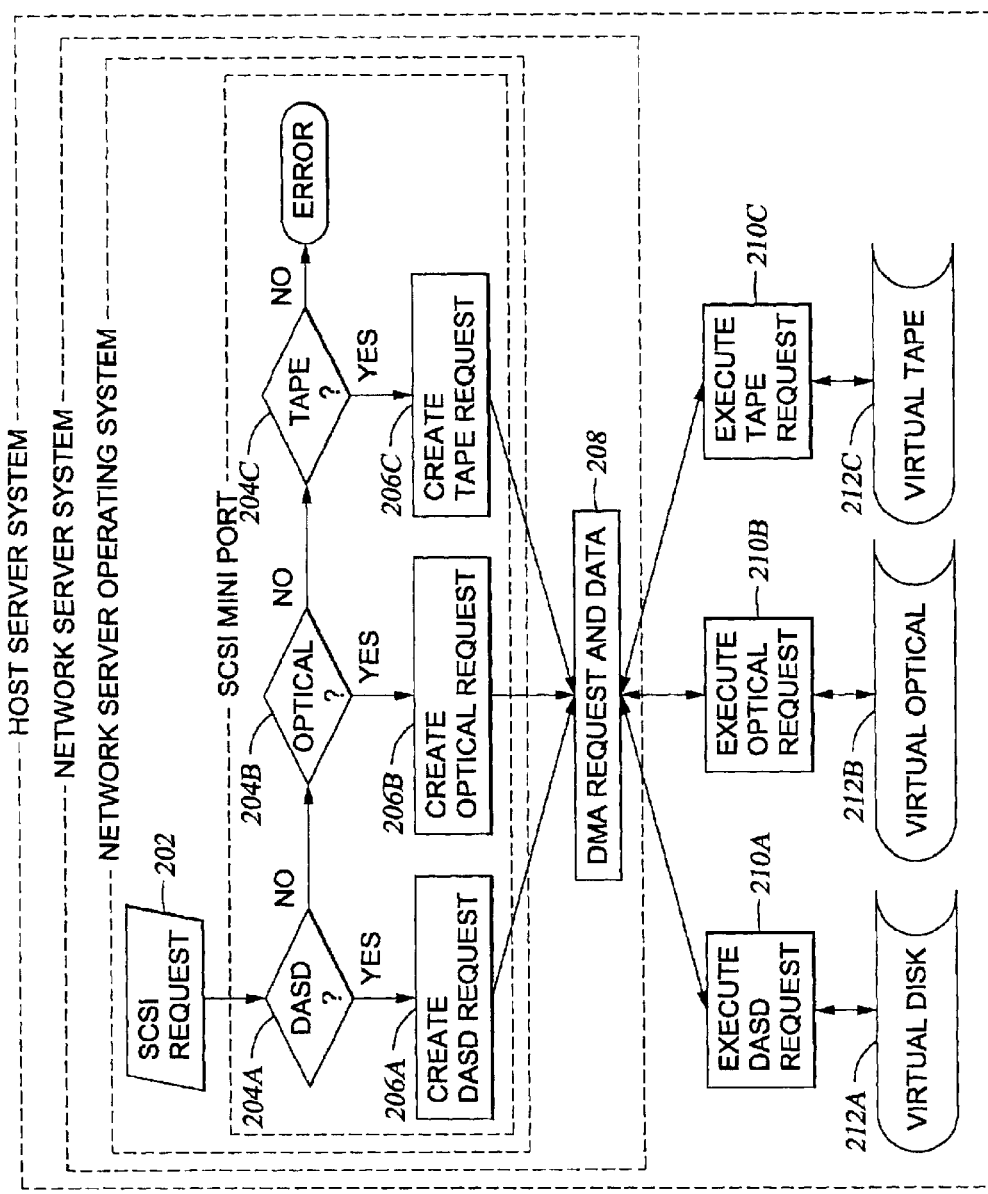
FIG. 2 is a schematic diagram illustrating one embodiment of a method 200 for controlling a plurality of devices attached to a host server system.

FIG. 2 is a schematic diagram illustrating one embodiment of a method 200 for controlling a plurality of devices attached to a host server system. FIG. 2 also illustrates the communication between components of the host server and network server systems according to one embodiment of the invention. The method 200 begins with a SCSI request 202 received by a SCSI MINIPORT. The SCSI MINIPORT is a device driver for controlling a plurality of SCSI attached devices, including storage devices such as DASD, optical storage devices and tape drives. The SCSI MINIPORT may be stored as program code in memory on the network server system or in a computer readable medium.

In one embodiment, the SCSI request is a Windows I/O request sent from SCSI PORT (Microsoft's interface program) to SCSI MINIPORT. The SCSI PORT is a software interface program running in the network server operating system (e.g., Windows 2000 server). The SCSI request may be generated on the network server system by a variety of programs, such as the network server operating system, an application running on the network server and a user program running on a client system connected to the network server. For example, the SCSI request may represent a read/write operation on a DASD as requested by an application program running on the network server. The SCSI PORT sends the SCSI request to the SCSI MINIPORT and calls into the SCSI MINIPORT. In one embodiment, the SCSI requests are standardized according to typical SCSI specifications which provide the sets of defined commands. Typically, the SCSI request includes a command descriptor block containing command information regarding the requested device, parameters and tasks.

After receiving the SCSI request from the SCSI PORT, the SCSI MINIPORT determines the type of SCSI device to which the SCSI request is directed. In one embodiment, as shown in FIG. 2, three types of SCSI storage devices are available, and the SCSI MINIPORT determines whether the SCSI request is directed to a DASD, an optical storage device or a tape drive (decision boxes 204a–c). Once the SCSI MINIPORT determines the type of storage device, the SCSI MINIPORT calls a DLL (dynamic link library) program to process the SCSI request.

The DLL program in the SCSI MINIPORT receives the SCSI request and converts the SCSI request into an I/O request (boxes 206a–c) that is specific to a SCSI device that is attached to the host server system. A DLL for the network server system may include a collection of DLL files or programs, including a plurality of device drivers for the SCSI devices. The I/O request created by the DLL is sent to the IOP on the network server system and converted to a DMA (Direct Memory Access) request (box 208). DMA allows data to be sent directly between a memory and an attached device (such as a disk drive). The DMA request for the SCSI storage device attached to the host server system (e.g., AS/400) is transported via a processor chip (e.g., Rhine chip) on the IOP on the network server system. The IOP on the network server system includes codes that provides DMA services to move data back and forth between the memory space on the network server system and the storage devices.

The IOP on the host server system interprets the received DMA request and performs the requested tasks on the requested SCSI device (boxes 210a–c). The IOP may include a plurality of IOM (Input/Output Managers), typically one IOM for each type of SCSI device (i.e., one IOM for DASD, one IOM for optical drives and one IOM for tape drives). Each of the actual SCSI devices may include a plurality of virtual storage spaces (boxes 212a–c) as defined by storage device images created by the host server operating system. The IOM determines the virtual storage space to which the request is directed and performs the requested tasks on the actual device representing the virtual storage space.

When the DMA request has been completed, the IOM on the host server system returns a signal to the IOP of the network server system. The processor chip on the IOP of the network server system then sends an interrupt signal to the SCSI MINIPORT to indicate completion of the I/O request. Then the SCSI MINIPORT replies to the Windows I/O request through SCSIPORT to signal completion of the SCSI request.

In one embodiment of the invention, the SCSI MINIPORT is a device driver which controls a plurality of storage devices connected to a host server system from a network server system. Synchronization mechanisms utilized for a plurality of device drivers on a network server operating system are no longer required because the SCSI MINIPORT represents a single device driver (instead of a plurality of device drivers) which communicates with the IOP of the network server system. Because synchronization mechanisms are no longer required, the performance of the network server system is improved, and the codes for the device driver are simplified.

While the foregoing is directed to embodiments of the present invention, other and further embodiments of the invention may be devised without departing from the basic scope thereof, and the scope thereof is determined by the claims that follow.

What is claimed is:

1. A method for controlling a plurality of devices of different device types connected to a host system, comprising:

receiving, by an Input/output processor (IOP) on a network server system, a device request from a network server operating system;

invoking a device driver of the network server system to handle the device request; the device driver bomb configured to operate as a single, integrated device driver to support the different device types of the plurality of devices;

determining, by the device driver of the network server system, a particular device type of the different device types to which the device request is directed;

creating a host system request for the particular device type; and sending the host system request to an input/output processor or the host system.

2. The method of claim 1 wherein the IOP on the network server system includes device driver for receiving the device request and determining the particular device type to which the device request is directed.

3. The method of claim 1 wherein the device request is a Small Computer System Interface (SCSI) request directed to a storage device connected to a SCSI bus of the host system.

4. The method of claim 1 wherein the host system request is a direct memory access (DMA) request.

5. The method of claim 1 wherein the plurality of devices include different types of storage devices selected from the group consisting of a direct access storage device (DASD), an optical drive, and a tape drive.

6. The method of claim 5 wherein the device driver is a SCSI MINIPORT configured to create host system requests for each type of storage device connected to the host system.

7. The method of claim 5, further comprising:

executing the host system request on one or more storage devices of the particular device type.

8. The method of claim 5 wherein the device request is directed to a virtual storage space defined on one or more storage devices of the particular device type.

9. The method of claim 8, further comprising:

executing the host system request on a virtual storage space defined on the one or more storage devices.

10. A medium containing program code that, when executed by a computer, causes the computer to perform a method for controlling a plurality of devices of different device types connected to a host system comprising:

receiving, by an input/output processor (IOP) on the computer, a device request from a computer operating system;

invoking a device driver of the computer to handle the device request the device driver being configured to operate as a single, integrated device driver to support the different device types of the plurality of devices;

determining, by the device driver of the computer, a particular device type of the different device types to which the device request is directed;

creating a host system request for the particular type; and sending the host system request to an input/output processor of the host system.

11. The medium of claim 10 wherein the IOP on the computer operating system includes device driver for receiving the device request and determining the particular device type to which the device request is directed.

12. The medium of claim 10 wherein the device request is a Small Computer System Interface (SCSI) request directed to a storage device connected to a SCSI bus of the host system.

13. The medium of claim 10 wherein the host system request is a direct memory access (DMA) request.

14. The medium of claim 10 wherein the plurality of devices include different types of storage devices selected from the group consisting of a direct access storage device (DASD), an optical drive, and a tape drive.

15. The medium of claim 14 wherein the device driver is a SCSI MINIPORT configured to create host system requests for each type of storage device connected to the host system.

16. The medium of claim 14 wherein the method further comprises:

executing the host system request on the one or more storage devices of the particular device type.

17. The medium of claim 14 wherein the device request is directed to a virtual storage space defined on one or more storage devices of the particular device type.

18. The medium of claim 17 wherein the method further comprises:

executing the host system request on a virtual storage space defined on the one or more storage devices.

19. A method for controlling a plurality of Small Computer System Interface (SCSI) storage devices of different device types connected to a host server system, comprising:

sending a SCSI request from a network sewer operating system to an input/output processor (IOP) on the network server system, wherein the IOP on the network server system includes a device driver for receiving the SCSI request;

invoking the device driver to handle the device request; the device driver being configured to operate as a single, integrated device driver to support the different device types of the plurality of SCSI storage devices;

determining, utilizing the device driver, the particular SCSI storage device type of the different device types to which the SCSI request is directed;

creating a host server system request for the particular SCSI storage device type; and sending the host server system request to an input/output processor of the host server system.

20. The method of claim 19 wherein the plurality of SCSI storage devices is selected from the group consisting of a direct access storage device (DASD), an optical drive, and a tape drive.

21. The method of claim 20 wherein the device driver is a SCSI MINIPORT configured to create host system requests for each type of SCSI storage device connected to the host system.

22. The method of claim 19 wherein the host system request is a direct memory access (DMA) request.

23. The method of claim 19, further comprising:

executing the host system request on the one of the plurality of storage devices of the particular SCSI storage device type.

24. The method of claim 19 wherein the SCSI request is directed to a virtual storage space defined on one of the plurality of SCSI storage devices of the particular SCSI storage device type.

25. The method of claim 24, further comprising:

executing the host system request on the virtual storage space defined on one of the plurality of SCSI storage devices of the particular SCSI storage device type.

* * * * *

UNITED STATES PATENT AND TRADEMARK OFFICE
CERTIFICATE OF CORRECTION

PATENT NO. : 6,915,524 B2 Page 1 of 1
DATED : July 5, 2005
INVENTOR(S) : Crowley et al.

It is certified that error appears in the above-identified patent and that said Letters Patent is hereby corrected as shown below:

Column 5,
Line 46, "bomb" should be -- being --.
Line 58, after "includes" insert -- the --.

Column 6,
Line 24, after "request" insert -- ; --.
Line 30, after "particular" insert -- device --.
Line 34, after "includes" insert -- the --.
Line 66, "sewer" should be -- server --.

Signed and Sealed this

Fourth Day of October , 2005

JON W. DUDAS
*Director of the United States Patent and Trademark Office*